United States Patent
Wang et al.

(10) Patent No.: US 11,938,636 B2
(45) Date of Patent: Mar. 26, 2024

(54) FEATURE-GUIDED SCANNING TRAJECTORY OPTIMIZATION METHOD FOR THREE-DIMENSIONAL MEASUREMENT ROBOT

(71) Applicant: Nanjing University of Aeronautics and Astronautics, Nanjing (CN)

(72) Inventors: Jun Wang, Nanjing (CN); Hangbin Zeng, Nanjing (CN); Yuanpeng Liu, Nanjing (CN); Zhengshui Kang, Nanjing (CN); Jianping Yang, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 18/321,840

(22) Filed: May 23, 2023

(65) Prior Publication Data

US 2023/0311319 A1    Oct. 5, 2023

(51) Int. Cl.
*B25J 9/16* (2006.01)
*G01B 21/20* (2006.01)
*B25J 19/02* (2006.01)

(52) U.S. Cl.
CPC ............ *B25J 9/1664* (2013.01); *G01B 21/20* (2013.01); *B25J 19/02* (2013.01)

(58) Field of Classification Search
CPC .......... B25J 9/1664; B25J 19/02; G01B 21/20
See application file for complete search history.

(56) References Cited

U.S. PATENT DOCUMENTS

2010/0235037 A1* 9/2010 Vian .................... G05D 1/0027
702/183
2022/0113711 A1* 4/2022 Nakayama ......... G05B 19/4207

FOREIGN PATENT DOCUMENTS

| CN | 107538487 A | 1/2018 |
| CN | 110017790 A | 7/2019 |
| CN | 110990952 A | 4/2020 |
| CN | 111553087 A | 8/2020 |
| CN | 111998797 A | 11/2020 |

(Continued)

OTHER PUBLICATIONS

Translation (by Schreiber Translations, Inc.) of "Jing Lin, "Research On Automatic Measurement Technology of Components Based On Laser Scanning Technology", 2019, Thesis in Mechanical Engineering, The Graduate School, Nanjing University of Aeronautics and Astronautics" (Year: 2019).*

(Continued)

*Primary Examiner* — Abby Y Lin
*Assistant Examiner* — Karston G. Evans

(57) ABSTRACT

A feature-guided scanning trajectory optimization method for a 3D measurement robot, including: building a 3D digital model of an aircraft surface; obtaining a size of the 3D digital model; extracting features to be measured; classifying the features to be measured; calculating a geometric parameter of each type of features to be measured; generating an initial scanning trajectory of each type of features to be measured; building a constraint model of the 3D measurement robot; optimizing the initial scanning trajectory into a local optimal scanning trajectory; and planning a global optimal scanning trajectory of each type of features to be measured on the aircraft surface by using a modified ant colony optimization algorithm.

8 Claims, 3 Drawing Sheets

(56) References Cited

FOREIGN PATENT DOCUMENTS

CN 114020045 A 2/2022
EP 2328308 A1 6/2011

OTHER PUBLICATIONS

Jisen, W., "Research on Six Degree of Freedom Robot Trajectory Planning Method Based on Improved Ant Colony Algorithm," 2021 IEEE 4th International Conference on Automation, Electronics and Electrical Engineering (AUTEEE), pp. 634-637 (Year: 2021).*
Mohamad, M., "Articulated Robot Motion Planning Using Ant Colony Optimisation," Sep. 2006, 3rd International IEEE Conference Intelligent Systems, pp. 690-695 (Year: 2006).*
Jing Lin, "Research on Automatic Measurement Technology of Components Based on Laser Scanning Technology", Chinese Excellent doctoral dissertation Full text Database (Master) Basic Science, 2019, pp. 36-55.
Yunquan Chen et al., "Three-Dimensional Automatic Detection Method for Large-Scale Structure of Aircraft Based on Robot", Aeronautical Manufacturing Technology, 2019, vol. 62, No. 10, pp. 51-57.
Weicou Zheng et al., "Enhanced Path Planning of Mobile Robot Using Kinect in Dynamic Environment", Journal of Jiangnan University(Natural Science Edition), 2015, vol. 14, No. 2, pp. 156-161.

* cited by examiner

FEATURE-GUIDED SCANNING TRAJECTORY OPTIMIZATION METHOD FOR THREE-DIMENSIONAL MEASUREMENT ROBOT

CROSS-REFERENCE TO RELATED APPLICATIONS

This application claims the benefit of priority from Chinese Patent Application No. 202210572343.X, filed on May 25, 2022. The content of the aforementioned application, including any intervening amendments thereto, is incorporated herein by reference in its entirety.

TECHNICAL FIELD

This application relates to robot path planning, and more particularly to a feature-guided scanning trajectory optimization method for a three-dimensional (3D) measurement robot.

BACKGROUND

As a strategic industry related to national security and national economy, the aviation manufacturing industry is an important indicator for evaluating the national industrialization level. The aviation manufacturing is characterized by high technology denseness, wide association range and strong civil-military integration and radiation effect. Aircraft assembly is an important part of the aircraft manufacturing, which greatly determines the final quality, manufacturing cost and production cycle of an aircraft.

During the aircraft assembly, it is required to precisely measure a surface profile of a part to ensure the assembly quality. In the traditional aircraft manufacturing process, the aerodynamic configuration measurement relies on analog detection and human eye-based visual judgment, and thus the measurement accuracy is susceptible to human factors. Moreover, the measurement efficiency is unsatisfactory, failing to enable the digital aircraft manufacturing and lean production.

SUMMARY

In view of the defects of the prior art, the present disclosure provides a feature-guided scanning trajectory optimization method for a 3D measurement robot. in which a feature to be measured is extracted from a 3D digital model; an initial scanning trajectory of the feature to be measured is generated; a constraint model of the 3D measurement robot is built; the initial scanning trajectory is optimized with the constraint model as optimization goal to obtain a local optimal scanning trajectory of the feature to be measured; and a global optimal scanning trajectory of features to be measured is obtained by calculation. The method provided herein has desirable efficiency, high automation level, and excellent accuracy.

Technical solutions of the disclosure are described as follows.

This application provides a feature-guided scanning trajectory optimization method of a 3D measurement robot, comprising:

(S1) building a 3D digital model of an aircraft surface; obtaining a size of the 3D digital model; extracting a feature to be measured from the 3D digital model; and classifying the feature to be measured;

(S2) calculating a geometric parameter of each type of features to be measured; and generating an initial scanning trajectory of each type of features to be measured;

(S3) building a constraint model of the 3D measurement robot; and optimizing the initial scanning trajectory of the features to be measured into a local optimal scanning trajectory; and (S4) based on the local optimal scanning trajectory, planning a global optimal scanning trajectory of each type of features to be measured of the aircraft surface by using a modified ant colony optimization algorithm.

In some embodiments, the step (S2) comprises:

setting a scanning width and a scanning depth of a 3D measurement scanner;

for each type of features to be measured, selecting a surface to be scanned;

generating trajectories on the surface to be scanned through direction-parallel scanning, wherein an interval between the trajectories is the scanning width;

generating a plane parallel to the surface to be scanned, wherein a distance between the plane and the surface to be scanned is the scanning depth; and intersecting the plane with a normal of each of the trajectories on the surface to be scanned to obtain the initial scanning trajectory.

In some embodiments, the constraint model of the 3D measurement robot satisfies the following conditions:

(a) a motion trajectory of the 3D measurement robot satisfies a design requirement;

(b) an effective scanning width of a 3D measurement scanner is greater than a distance between adjacent initial scanning trajectories;

(c) an out-of-plane angle of the 3D measurement scanner is not greater than a preset value; and (d) an in-plane angle of the 3D measurement scanner is not greater than a preset value.

In some embodiments, the step (S3) comprises:

(S31) based on a flange coordinate system of the 3D measurement robot, converting a posture change of the 3D measurement robot during a scanning process into changes of scanning depth d, yaw angle $\alpha$, pitch angle $\beta$ and rotation angle $\omega$; and building the constraint model of the 3D measurement robot;

(S32) based on the constraint model of the 3D measurement robot, traversing initial scanning trajectories of all types of features to be measured; and constructing a trajectory optimization evaluating function E, expressed as:

$$E = 5 \times 10^{-5} \times \sqrt{(1.2d_{max}-d)^2} \times \sqrt{(\phi-0.6\phi_{min})^2} + \lambda + \mu \sqrt{(\phi-0.3\phi_{min})^2};$$

wherein $\omega$ is an out-of-plane angle; $\varphi$ is an in-plane angle; $\lambda$ is a penalty factor of the trajectory optimization evaluating function; $\mu$ is a penalty factor of the in-plane angle; $d_{max}$ is a maximum scanning depth; and $\omega_{min}$ is a minimum out-of-plane angle; and (S33) repeating the step (S32) successively with the scanning depth, in-plane angle and out-of-plane angle as a single variable to minimize the trajectory optimization evaluating function E, so as to obtain the local optimal scanning trajectory of each type of features to be measured, expressed as:

$$\min E(d, \alpha, \beta, \omega) = 5 \times 10^{-5} \times \sqrt{(1.2 d_{max} - d)^2} \times \sqrt{(\varphi - 0.6\varphi_{min})^2} + \lambda + \mu \sqrt{(\phi - 0.3\phi_{min})^2}$$

$$\text{s.t.} \begin{cases} l_i \geq l_{min}, \ i = 1, 2 \\ \varphi \in [-40°, 40°] \\ \phi \in [\phi_{min}, \phi_{max}] \end{cases}$$

wherein $l_i$ is an effective scanning width of a 3D measurement scanner; $l_{min}$ is a width between the initial scanning trajectories; $\varphi_{min}$ represents a minimum in-plane angle; and $\varphi_{max}$ represents a maximum in-plane angle.

In some embodiments, the scanning depth d ranges from $d_{min}$ to $d_{max}$; the yaw angle $\alpha$ ranges from $$-\frac{\pi}{2} \text{ to } \frac{\pi}{2};$$

the pitch angle $\beta$ ranges from $$-\frac{\pi}{2} \text{ to } \frac{\pi}{2};$$

and the rotation angle $\omega$ ranges from $-\pi$ to $\pi$.

In some embodiments, the step (S4) comprises:

(S41) determining a starting feature to be measured S and a target feature to be measured D; and initializing a pheromone, a search path and a tabu list of individual feature nodes to be measured to build a 3D working environment of the aircraft surface;

(S42) placing M ants at the starting feature to be measured S; placing the starting feature to be measured S into the tabu list; calculating a state transfer probability of each of the M ants for individual feature nodes to be measured in a next plane; and randomly selecting a next feature node to be measured by using a roulette wheel selection method;

(S43) determining whether the target feature to be measured D has been reached; completing a search after all ants reach the target feature to be measured D; arranging lengths of crawling paths of all ants in an ascending order; and updating the number of ants and a pheromone value of individual feature nodes to be measured on a corresponding path;

(S44) setting the number of updates v; if the global optimal scanning trajectory does not change after consecutive v iterations, adjusting a pheromone volatilization factor, and then returning to the step (S42), expressed as:

$$\tau(N) = \begin{cases} 0.9 \times \tau(N-1), \ \tau(N) > \tau_{min} \\ \tau_{min}, \ \tau(N) \leq \tau_{min} \end{cases};$$

wherein N is a current iteration number; and $\tau_{min}$ represents a minimum pheromone; and (S45) determining whether the maximum number of iterations has been reached; if yes, outputting a length of the global optimal scanning trajectory; otherwise, clearing the tabu list, and then returning to the step (S42).

In some embodiments, the pheromone of individual feature nodes to be measured is initialized as follows:

$$\rho_{P_a}^0 = \begin{cases} \rho_0 + \sigma \times \left(1 - \frac{2 dist(P_a, L)}{L_m}\right), \ dist(P_a, L) \leq L_m \\ \rho_0, \ dist(P_a, L) > L_m \end{cases};$$

wherein $\rho_0$ is an initial pheromone of individual feature nodes to be measured; L is a line segment connecting the starting feature to be measured S and the target feature to be measured D; $L_m$ is a width of a plane in the 3D working environment perpendicular to the line segment L; dist($P_a$, L) is a distance from a feature node to be measured $P_a$ to the line segment L; and $\sigma$ is a map scale factor.

In some embodiments, the state transfer probability $P_{a,a+1}^k$ is calculated as follows:

$$P_{a,a+1}^k = \begin{cases} \frac{[\rho_{a,a+1}(k)]^{\alpha(N)} [H_{a,a+1}(k)]^{\beta(N)}}{\sum [\rho_{a,a+1}(k)]^{\alpha(N)} [H_{a,a+1}(k)]^{\beta(N)}}, \ P_{a+1} \in R(P_a) \\ 0, \ P_{a+1} \notin R(P_a) \end{cases};$$

$$\alpha(N) = \cos\left(\frac{N \cdot \pi}{2 \cdot N_{max}}\right)$$
$$\beta(N) = \sin\left(\frac{N \cdot \pi}{2 \cdot N_{max}}\right); \text{ and}$$

$$H(k) = \frac{1}{d_{a,a+1}};$$

wherein k represents a $k^{th}$ ant; N is the current iteration number; $N_{max}$ is the maximum number of iterations; $\rho_{a,a+1}(k)$ is a pheromone of the $k^{th}$ ant between a feature node to be measured a and a feature node to be measured a+1; $H_{a,a+1}(k)$ and H(k) represent a heuristic function of the $k^{th}$ ant between individual feature nodes to be measured a and individual feature nodes to be measured a+1; $d_{a,a+1}$ is a distance between individual feature nodes to be measured a and individual feature nodes to be measured a+1; $\alpha(N)$ is a pheromone factor of a $N^{th}$ iteration; $\beta(N)$ is a heuristic function factor of the $N^{th}$ iteration; and $R(P_a)$ is a feasible region of the 3D working environment.

In some embodiments, the number of ants is updated as follows:

$$\Delta \rho = \frac{M}{dist(k)},$$

rank $(k) \leq \varepsilon N$;

and the pheromone $\rho$ of individual feature nodes to be measured is updated as follows:

$\rho = (1-\tau)\rho + \tau \Delta \rho$;

wherein dist(k) is a crawling distance of a $k^{th}$ ant; rank(k) is a rank of the $k^{th}$ ant; $\varepsilon N$ is the number of ants after updating; and $\tau$ is the pheromone volatilization factor.

Compared to the prior art, this application has the following beneficial effects.

Regarding the method provided herein, features to be measured are extracted from the 3D digital model, and the initial scanning trajectory of the features to be measured is generated; a constraint model of the 3D measurement robot is built, and the initial scanning trajectory is optimized with the constraint model as optimization objective to obtain the local optimal scanning trajectory; and the global optimal scanning trajectory of the features to be measured is calculated. The scanning trajectory optimization method provided herein improves the trajectory generation efficiency and reduces the overall scanning error.

DETAILED DESCRIPTION OF EMBODIMENTS

The present disclosure will be described below in detail with reference to the accompanying drawings and embodiments. It should be noted that described above are merely illustrative of the present disclosure, and not intended to limit the present disclosure.

Figure 1:
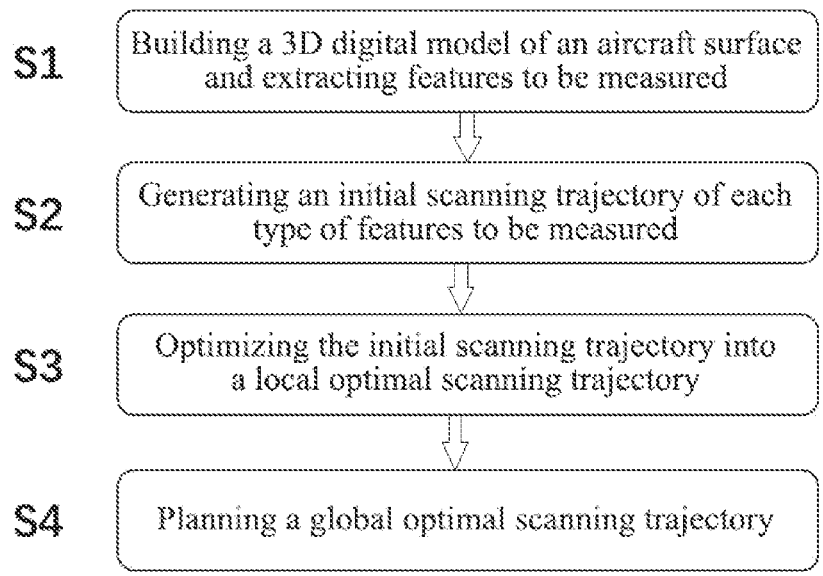
FIG. 1 is a flow chart of a feature-guided scanning trajectory optimization method for a 3D measurement robot according to an embodiment of the disclosure.

Referring to FIG. 1, a feature-guided scanning trajectory optimization method for a 3D measurement robot is performed through the following steps.

(S1) A 3D digital model of an aircraft surface is built. A size of the 3D digital model is obtained. Features to be measured are extracted. The features to be measured are classified.

(S2) A geometric parameter of each type of features to be measured is calculated. An initial scanning trajectory of each type of features to be measured is generated. The step (S2) includes the following steps.

A scanning width and a scanning depth of a 3D measurement scanner are set. For each type of features to be measured, a surface to be scanned is selected. Trajectories on the surface to be scanned are generated through direction-parallel scanning. An interval between the trajectories is the scanning width. A plane parallel to the surface to be scanned is generated. A distance between the plane and the surface to be scanned is the scanning depth. The plane with a normal of each of the trajectories is intersected on the surface to be scanned to obtain the initial scanning trajectory. The initial scanning trajectory is well-spaced and surface-fitted, facilitating a subsequent trajectory optimization.

(S3) A constraint model of the 3D measurement robot is built. The initial scanning trajectory of each type of features to be measured is optimized into a local optimal scanning trajectory. The step (S3) includes the following steps.

(S31) Based on a flange coordinate system of the 3D measurement robot, a posture change of the 3D measurement robot during a scanning process is converted into changes of scanning depth d, yaw angle α, pitch angle β and rotation angle ω. The constraint model of the 3D measurement robot is built. Since the 3D measurement scanner calculates the initial scanning trajectory by itself and the surface to be scanned, it is sufficient to make the 3D measurement scanner perpendicular to the surface to be scanned during the scanning process. However, there are motion constraints of the 3D measurement robot which supports the 3D measurement scanner. Assuming that there are no such motion constraints, during scanning of smooth surfaces, the 3D measurement scanner can scan in any posture within a feasible region of a scanning parameter thereof, and can generate an optimal posture during an initial scanning trajectory generation to reduce scanning error. However, due to the motion constraints of the 3D measurement robot, which limit the feasible region of the scanning parameter, a scan parameter with the smallest error in a definition field of the scan parameter may not necessarily satisfy a constraint. Accordingly, the constraint model of the 3D measurement robot satisfies the following conditions.

(a) A motion trajectory of the 3D measurement robot satisfies a design requirement;

(b) An effective scanning width of a 3D measurement scanner is greater than a distance between adjacent initial scanning trajectories;

(c) An out-of-plane angle of the 3D measurement scanner is not greater than a preset value; and (d) An in-plane angle of the 3D measurement scanner is not greater than a preset value.

The scanning depth d ranges from $d_{min}$ to $d_{max}$. The yaw angle α ranges from $$-\frac{\pi}{2}$$

to $$\frac{\pi}{2}.$$

The pitch angle β ranges from $$-\frac{\pi}{2}$$

to $$\frac{\pi}{2}.$$

The rotation angle ω ranges from −π to π.

(S32) Based on the constraint model of the 3D measurement robot, initial scanning trajectories of all types of features to be measured are traversed. A trajectory optimization evaluating function E is constructed. According to results of multiple experiments, when the scanning depth is constant, the scanning error increases with an increase of the out-of-plane angle. When the scanning depth is larger, the influence of the out-of-plane angle on systematic error is smaller and the scanning error varies linearly with the out-of-plane angle in which a slope of linear trend decreases as the scanning depth increases. The scanning error almost has a bilinear relationship with the scanning depth and the out-of-plane angle.

The trajectory optimization evaluating function E is expressed as follows:

$$E = 5 \times 10^{-5} \times \sqrt{(1.2 d_{max} - d)^2} \times \sqrt{(\phi - 0.6 \phi_{min})^2} + \lambda + \mu \sqrt{(\varphi - 0.3 \varphi_{min})^2};$$

where ϕ is an out-of-plane angle; φ is an in-plane angle; λ is a penalty factor of the trajectory optimization evaluating function; μ is a penalty factor of the in-plane angle; $d_{max}$ is a maximum scanning depth; and $\phi_{min}$ min is a minimum out-of-plane angle.

(S33) The step (S32) is successively repeated with the scanning depth, in-plane angle and out-of-plane angle as a single variable to minimize the trajectory optimization evaluating function E, so as to obtain the local optimal scanning trajectory of the feature to be measured, expressed as follows:

$$\min E(d, \alpha, \beta, \omega) =$$

$$5 \times 10^{-5} \times \sqrt{(1.2 d_{max} - d)^2} \times \sqrt{(\varphi - 0.6\varphi_{min})^2} + \lambda + \mu \sqrt{(\phi - 0.3\phi_{min})^2}$$

$$\text{s.t.} \begin{cases} l_i \geq l_{min}, \ i = 1, 2 \\ \varphi \in [-40°, 40°] \\ \phi \in [\phi_{min}, \phi_{max}] \end{cases};$$

where h is an effective scanning width of a 3D measurement scanner; $l_{min}$ is a width between the initial scanning trajectories; $\phi_{min}$ represents a minimum in-plane angle; and $\phi_{max}$ represents a maximum in-plane angle.

Figure 2:
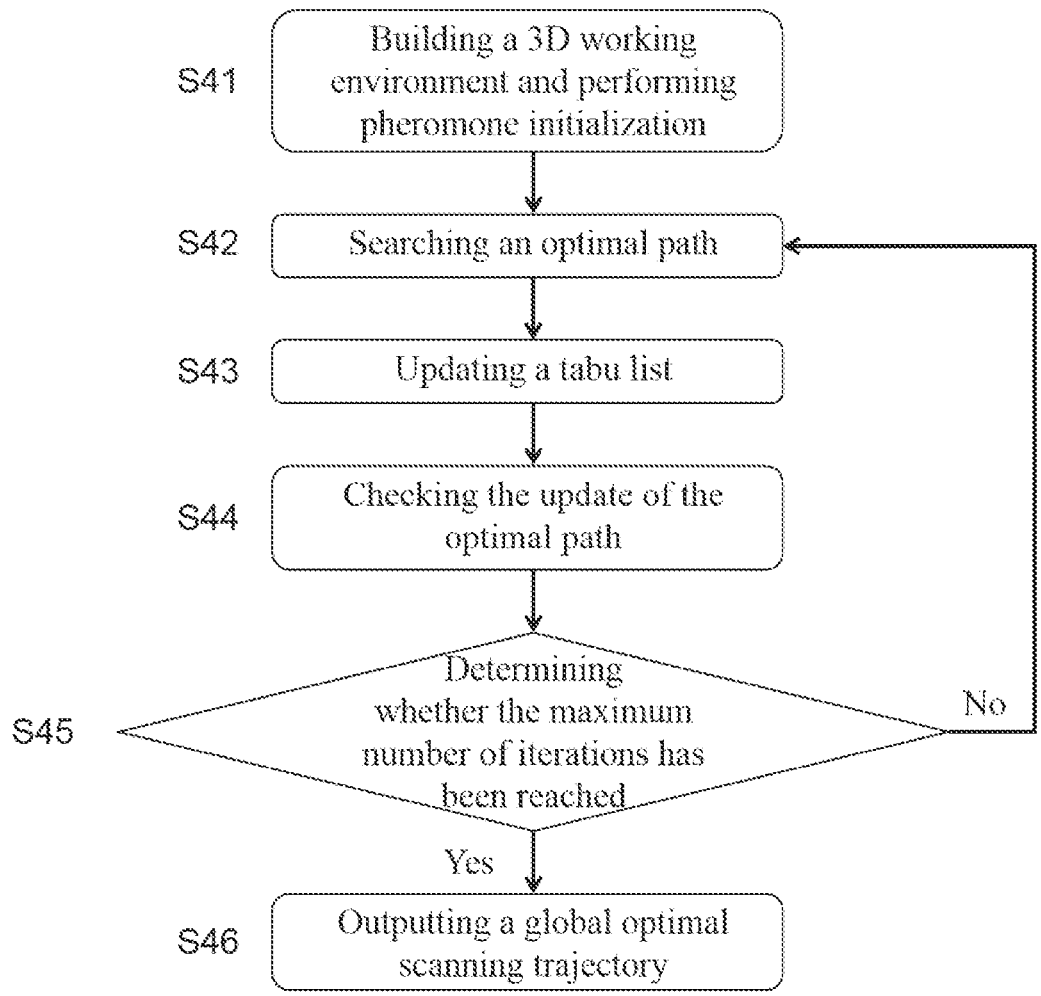
FIG. 2 is a flow chart illustrating the planning of a global optimal scanning trajectory of features to be measured by using a modified ant colony optimization algorithm.
Figure 3:
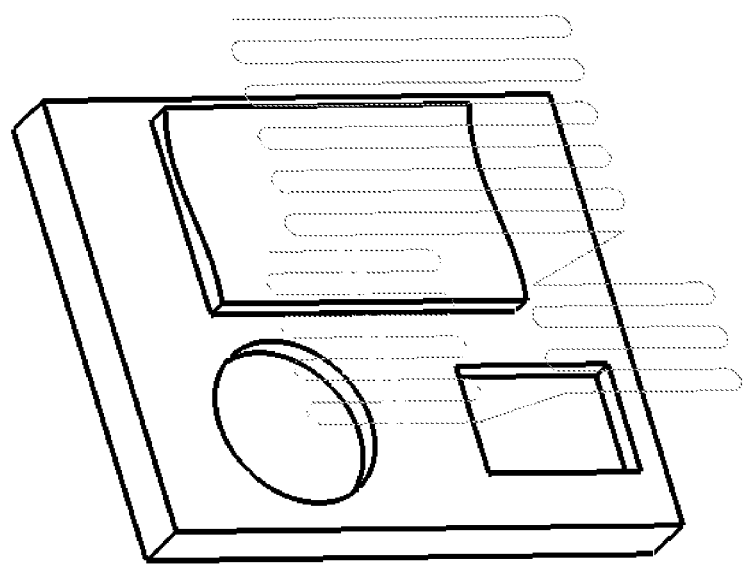
FIG. 3 schematically depicts the global optimal scanning trajectory obtained by means of the feature-guided scanning trajectory optimization method according to an embodiment of the disclosure.

(S4) The features to be measured can be simplified to individual feature nodes to be measured since the features to be measured are spaced apart from each other. Based on the local optimal scanning trajectory of the feature to be measured, a global optimal scanning trajectory of each type of features to be measured of the aircraft surface is planned by using a modified ant colony optimization. As shown in FIG. 2, the step (S4) includes the following steps.

(S41) A starting feature to be measured S and a target feature to be measured D are determined. A pheromone, a search path and a tabu list of individual feature nodes to be measured are initialized to build a 3D working environment of the aircraft surface. Since the global optimal scanning trajectory generally at a line segment L connecting the starting feature to be measured S and the target feature to be measured D, an initialization of the pheromone of individual feature nodes to be measured distributes the pheromone according to a distance of individual feature nodes to be measured from the line segment L. This distribution has reduced iterations and improved an optimization efficiency than random distribution, which is expressed as follows:

$$\rho_{P_a}^0 = \begin{cases} \rho_0 + \sigma \times \left(1 - \dfrac{2 dist(P_a, L)}{L_m}\right), & dist(P_a, L) \leq L_m \\ \rho_0, & dist(P_a, L) > L_m \end{cases};$$

where $\rho_0$ is an initial pheromone of individual feature nodes to be measured; L is a line segment connecting the starting feature to be measured S and the target feature to be measured D; $L_m$ is a width of a plane in the 3D working environment perpendicular to the line segment L; $dist(P_a, L)$ is a distance from a feature node to be measured $P_a$ to the line segment L; and $\sigma$ is a map scale factor.

(S42) M ants are placed at the starting feature to be measured S. The starting feature to be measured S is placed into the tabu list. A state transfer probability of each of the M ants for individual feature nodes to be measured in a next plane is calculated. A next feature node to be measured is randomly selected by using roulette wheel selection method.

As the number of iterations increases, an importance of a pheromone factor for path selection gradually decreases. At an initial stage, the pheromone factor has a greater influence on the path selection due to a different pheromone concentration of feature nodes, therefore, $\alpha(N)$ should be larger and $\beta(N)$ should be smaller. Later, the pheromone concentration on optimal scanning trajectory is gradually much higher than the other trajectories. The importance of pheromone concentration in path selection is gradually reduced in order to prevent the algorithm from falling into local optimum, that is, $\alpha(N)$ should be decreased and $\beta(N)$ should be increased, so as to facilitate obtaining the global optimal scanning trajectory. Hence, the state transfer probability changes the pheromone factor and a heuristic function factor to dynamic parameters, and assigns the pheromone factor and the heuristic function factor respectively using cosine function and sine function to change the pheromone factor and the heuristic function factor with iterations. The state transfer probability $P_{a,a+1}^k$ is calculated as follows:

$$P_{a,a+1}^k = \begin{cases} \dfrac{[\rho_{a,a+1}(k)]^{\alpha(N)} [H_{a,a+1}(k)]^{\beta(N)}}{\sum [\rho_{a,a+1}(k)]^{\alpha(N)} [H_{a,a+1}(k)]^{\beta(N)}}, & P_{a+1} \in R(P_a) \\ 0, & P_{a+1} \notin R(P_a) \end{cases};$$

$$\alpha(N) = \cos\left(\dfrac{N \cdot \pi}{2 \cdot N_{max}}\right)$$

$$\beta(N) = \sin\left(\dfrac{N \cdot \pi}{2 \cdot N_{max}}\right)$$

; and $$H(k) = \dfrac{1}{d_{a,a+1}};$$

where k represents a $k^{th}$ ant; N is the current iteration number; $N_{max}$ is the maximum number of iterations; $\rho_{a,a+1}(k)$ is a pheromone of the $k^{th}$ ant between a feature node to be measured a and a feature node to be measured a+1; $H_{a,a+1}(k)$ and $H(k)$ represent a heuristic function of the $k^{th}$ ant between individual feature nodes to be measured a and individual feature nodes to be measured a+1; $d_{a,a+1}$ is a distance between individual feature nodes to be measured a and individual feature nodes to be measured a+1; $\alpha(N)$ is a pheromone factor of a $N^{th}$ iteration; $\beta(N)$ is a heuristic function factor of the $N^{th}$ iteration; and $R(P_a)$ is a feasible region of the 3D working environment.

(S43) Whether the target feature to be measured D has been reached is determined. Search is performed after all ants reach the target feature to be measured D. Lengths of crawling paths of all ants are arranged in an ascending order. The number of ants and a pheromone of individual feature nodes to be measured on a corresponding path are updated simultaneously to achieve a higher pheromone on the path in a next iteration, so as to achieve a higher probability that the ant chooses the path, thus the global optimal scanning trajectory is found. The number of ants is updated as follows:

$$\Delta \rho = \dfrac{M}{dist(k)},$$

$$\text{rank }(k) \leq \varepsilon N;$$

and
the pheromone P of individual feature nodes to be measured is updated as follows:

$$\rho = (1-\tau)\rho + \tau \Delta \rho$$

where $dist(k)$ is a crawling distance of a $k^{th}$ ant; $rank(k)$ is a rank of the $k^{th}$ ant; $\varepsilon N$ is the number of ants after updating; and $\tau$ is the pheromone volatilization factor.

(S44) In order to prevent a path from falling into a local optimum situation, the number of updates v is set. If the global optimal scanning trajectory does not change after consecutive v iterations, the pheromone volatilization factor is adjusted followed by returning to the step (S42), expressed as follows:

$$\tau(N) = \begin{cases} 0.9 \times \tau(N-1), & \tau(N) > \tau_{min} \\ \tau_{min}, & \tau(N) \leq \tau_{min} \end{cases};$$

where N is a current iteration number; and $\tau_{min}$ represents a minimum pheromone.

(S45) Whether the maximum number of iterations has been reached is determined. If yes, executing a step (S46) that a length of the global optimal scanning trajectory is output. Otherwise, the tabu list is cleared followed by returning to the step (S42).

An initial scanning trajectory of each type of features is generated. A base of a scanning trajectory of the 3D measurement robot is determined and a constraint model of the 3D measurement robot is built. The initial scanning trajectory is optimized to enable the initial scanning trajectory to conform to a motion of the 3D measuring robot. There are multiple features at aircraft, a global optimal scanning trajectory of the multiple features is planned by using a modified ant colony optimization based on the local optimal scanning trajectory.

Described above are only some embodiments of the present disclosure, which are not intended to limit the disclosure. It should be understood that any variations and modifications made by those of ordinary skilled in the art without departing from the spirit of the disclosure should fall within the scope of the disclosure defined by the appended claims.

What is claimed is:

1. A feature-guided scanning trajectory optimization method for a three-dimensional (3D) measurement robot, comprising:
   (S1) building a 3D digital model of an aircraft surface; obtaining a size of the 3D digital model; extracting features to be measured from the 3D digital model; and classifying the features to be measured;
   (S2) calculating a geometric parameter of each type of features to be measured; and generating an initial scanning trajectory of each type of features to be measured;
   (S3) building a constraint model of the 3D measurement robot; and optimizing the initial scanning trajectory of each type of features to be measured into a local optimal scanning trajectory; and
   (S4) based on the local optimal scanning trajectory, planning a global optimal scanning trajectory of the features to be measured of the aircraft surface by using a modified ant colony optimization algorithm;
   wherein the step (S3) comprises:
   (S31) based on a flange coordinate system of the 3D measurement robot, converting a posture change of the 3D measurement robot during a scanning process into changes of scanning depth d, yaw angle $\alpha$, pitch angle $\beta$ and rotation angle $\omega$; and building the constraint model of the 3D measurement robot;
   (S32) based on the constraint model of the 3D measurement robot, traversing initial scanning trajectories of all types of features to be measured; and constructing a trajectory optimization evaluating function E, expressed as:

$$E = 5 \times 10^{-5} \times \sqrt{(1.2 d_{max} - d)^2} \times \sqrt{(\phi - 0.6\phi_{min})^2} + \lambda + \mu \sqrt{(\varphi - 0.3\varphi_{min})^2};$$

wherein $\phi$ is an out-of-plane angle; $\varphi$ is an in-plane angle; $\lambda$ is a penalty factor of the trajectory optimization evaluating function; $\mu$ is a penalty factor of the in-plane angle; $d_{max}$ is a maximum scanning depth; and $\phi_{min}$ is a minimum out-of-plane angle; and (S33) repeating the step (S32) successively with the scanning depth, in-plane angle and out-of-plane angle as a single variable to minimize the trajectory optimization evaluating function E, so as to obtain the local optimal scanning trajectory of each type of features to be measured, expressed as:

$$\min E(d, \alpha, \beta, \omega) = $$
$$5 \times 10^{-5} \times \sqrt{(1.2 d_{max} - d)^2} \times \sqrt{(\varphi - 0.6\varphi_{min})^2} + \lambda + \mu \sqrt{(\phi - 0.3\phi_{min})^2}$$
$$s.t. \begin{cases} l_i \geq l_{min}, \ i = 1, 2 \\ \varphi \in [-40°, 40°] \\ \phi \in [\phi_{min}, \phi_{max}] \end{cases};$$

wherein $l_i$ is an effective scanning width of a 3D measurement scanner; $l_{min}$ is a width between the initial scanning trajectories; $\varphi_{min}$ represents a minimum in-plane angle; and $\varphi_{max}$ represents a maximum in-plane angle.

2. The feature-guided scanning trajectory optimization method of claim 1, wherein the step (S2) comprises:
   setting a scanning width and a scanning depth of the 3D measurement scanner;
   for each type of features to be measured, selecting a surface to be scanned;
   generating trajectories on the surface to be scanned through direction-parallel scanning, wherein an interval between the trajectories is the scanning width;
   generating a plane parallel to the surface to be scanned, wherein a distance between the plane and the surface to be scanned is the scanning depth; and
   intersecting the plane with a normal of each of the trajectories on the surface to be scanned to obtain the initial scanning trajectory.

3. The feature-guided scanning trajectory optimization method of claim 1, wherein the constraint model of the 3D measurement robot satisfies the following conditions:
   (a) a motion trajectory of the 3D measurement robot satisfies a design requirement;
   (b) an effective scanning width of the 3D measurement scanner is greater than a distance between adjacent initial scanning trajectories;
   (c) an out-of-plane angle of the 3D measurement scanner is not greater than a preset value; and
   (d) an in-plane angle of the 3D measurement scanner is not greater than a preset value.

4. The feature-guided scanning trajectory optimization method of claim 1, wherein the scanning depth d ranges from $d_{min}$ to $d_{max}$; the yaw angle $\alpha$ ranges from $$-\frac{\pi}{2}$$

to $$\frac{\pi}{2};$$

the pitch angle $\beta$ ranges from $$-\frac{\pi}{2}$$

to $$\frac{\pi}{2};$$

and the rotation angle $\omega$ ranges from $-\pi$ to $\pi$.

5. The feature-guided scanning trajectory optimization method of claim 1, wherein the step (S4) comprises:
(S41) determining a starting feature to be measured S and a target feature to be measured D, and initializing a pheromone, a search path and a tabu list of individual feature nodes to be measured to build a 3D working environment of the aircraft surface;
(S42) placing M ants at the starting feature to be measured S; placing the starting feature to be measured S into the tabu list; calculating a state transfer probability of each of the M ants for individual feature nodes to be measured in a next plane; and randomly selecting a next feature node to be measured by using a roulette wheel selection method;
(S43) determining whether the target feature to be measured D has been reached; completing a search after all ants reach the target feature to be measured D; arranging lengths of crawling paths of all ants in an ascending order; and updating the number of ants and a pheromone value of individual feature nodes to be measured on a corresponding path;
(S44) setting the number of updates v; if the global optimal scanning trajectory does not change after consecutive v iterations, adjusting a pheromone volatilization factor, and then returning to the step (S42), expressed as:

$$\tau(N) = \begin{cases} 0.9 \times \tau(N-1), & \tau(N) > \tau_{min} \\ \tau_{min}, & \tau(N) \leq \tau_{min} \end{cases},$$

wherein N is a current iteration number; $\tau(N)$ represents a pheromone volatilization factor of a $N^{th}$ iteration; and $\tau_{min}$ represents a minimum pheromone; and
(S45) determining whether the maximum number of iterations has been reached; if yes, outputting a length of the global optimal scanning trajectory; otherwise, clearing the tabu list, and then returning to the step (S42).

6. The feature-guided scanning trajectory optimization method of claim 5, wherein the pheromone of individual feature nodes to be measured is initialized as follows:

$$\rho_{P_a}^0 = \begin{cases} \rho_0 + \sigma \times \left(1 - \frac{2 dist(P_a, L)}{L_m}\right), & dist(P_a, L) \leq L_m \\ \rho_0, & dist(P_a, L) > L_m \end{cases};$$

wherein $\rho_0$ is an initial pheromone of individual feature nodes to be measured; L is a line segment connecting the starting feature to be measured S and the target feature to be measured D; $L_m$ is a width of a plane in the 3D working environment perpendicular to the line segment L; dist($P_a$, L) is a distance from a feature node to be measured $P_a$ to the line segment L; and $\sigma$ is a map scale factor.

7. The feature-guided scanning trajectory optimization method of claim 5, wherein the state transfer probability $P_{a,a+1}^k$ is calculated as follows:

$$P_{a,a+1}^k = \begin{cases} \frac{[\rho_{a,a+1}(k)]^{\alpha(N)}[H_{a,a+1}(k)]^{\beta(N)}}{\sum [\rho_{a,a+1}(k)]^{\alpha(N)}[H_{a,a+1}(k)]^{\beta(N)}}, & P_{a+1} \in R(P_a) \\ 0, & P_{a+1} \notin R(P_a) \end{cases};$$

$$\alpha(N) = \cos\left(\frac{N \cdot \pi}{2 \cdot N_{max}}\right)$$

$$\beta(N) = \sin\left(\frac{N \cdot \pi}{2 \cdot N_{max}}\right)$$

; and $$H(k) = \frac{1}{d_{a,a+1}};$$

wherein k represents a $k^{th}$ ant; N is the current iteration number; $N_{max}$ is the maximum number of iterations; $\rho_{a,a+1}(k)$ is a pheromone of the $k^{th}$ ant between a feature node to be measured a and a feature node to be measured a+1; $H_{a,a+1}(k)$ represents a heuristic function of the $k^{th}$ ant between individual feature nodes to be measured a and individual feature nodes to be measured a+1; $d_{a,a+1}$ is a distance between individual feature nodes to be measured a and individual feature nodes to be measured a+1; $\alpha(N)$ is a pheromone factor of a $N^{th}$ iteration; $\beta(N)$ is a heuristic function factor of the $N^{th}$ iteration; and $R(P_a)$ is a feasible region of the 3D working environment.

8. The feature-guided scanning trajectory optimization method of claim 5, wherein the number of ants is updated as follows:

$$\Delta \rho = \frac{M}{dist(k)},$$

rank $(k) \leq \varepsilon N$;

and
the pheromone $\rho$ of individual feature nodes to be measured is updated as follows:

$$\rho = (1-\tau)\rho + \tau \Delta \rho;$$

wherein dist(k) is a crawling distance of a $k^{th}$ ant; rank(k) is a rank of the $k^{th}$ ant; $\varepsilon N$ is the number of ants after updating; and $\tau$ is the pheromone volatilization factor.

* * * * *